United States Patent [19]

Sugahara

[11] Patent Number: 5,283,656
[45] Date of Patent: Feb. 1, 1994

[54] DATA COMPRESSION APPARATUS FOR VIDEO SIGNAL AND METHOD OF DATA COMPRESSION FOR VIDEO SIGNAL

[75] Inventor: Takayuki Sugahara, Yokosuka, Japan

[73] Assignee: Victor Company of Japan, Ltd., Yokohama, Japan

[21] Appl. No.: 772,295

[22] Filed: Oct. 7, 1991

[30] Foreign Application Priority Data

Oct. 8, 1990 [JP] Japan .................. 2-270017

[51] Int. Cl.⁵ .................. H04N 1/41; H04N 1/415; H04N 7/12
[52] U.S. Cl. .................. 358/261.1; 358/261.2; 358/430; 358/433; 348/420; 348/437
[58] Field of Search .................. 358/430, 432, 433, 133, 358/135, 136, 261.2, 261.3, 261.1

[56] References Cited

U.S. PATENT DOCUMENTS 5,073,821 12/1991 Juri .................. 358/133

OTHER PUBLICATIONS

"Description of Ref. Model 8 (RM8)"; Specialist Group On Coding for Visual Telephony; Jun. 9, 1989; pp. 28–30.
"ISO Adaptive Discrete Cosine Transform Coding Scheme For Still Image Telecommunication Services"; published by ISO/TC97/SC2/WG8-ADCTG: Jan. 25, 1988; pp. 14–17.
Journal of Japanese Society of Electronics and Information Communications; '86/12 vol. J69-B No. 12; p. 1734.
"A Rate-Adaptive DCT Coding For Use In Solid-State Still Camera"; Spring Meeting of Japanese Society of Electronics and Information Communications; 1989; pp. 7–141.
"Activity Detection Methof For Solid-State Still Video Camera Using DCT Data Compression"; Spring Meeting of Japanese Society of Electronics and Information Communications; 1989; pp. 7–79.
Hiroshi Yasuda, "Color still picture coding international standarization", Journal of the institute of image electronics engineers of Japan, vol. 18, No. 6, 1989, pp. 398–407.

Primary Examiner—Edward L. Coles, Sr.
Assistant Examiner—Scott A. Rogers
Attorney, Agent, or Firm—Lowe, Price, LeBlanc & Becker

[57] ABSTRACT

A data compression apparatus for video data having: a dividing circuit for dividing the video data into unit blocks, a converter for orthogonally converting the video data at each of unit blocks, a quantizer for quantizing the orthogonally converted video data, and a coder for run-length-coding the quantized video data, comprises: a first detector for detecting powers of the video data in the horizontal and vertical directions within given bandpasses respectively; a second detector for detecting a difference between the powers; and a controller for controlling the amount of coded data produced by the run-length-coding in accordance with a total of the powers and the difference. This apparatus controls the amount of coded data in accordance with power of input video data and difference between powers of video data of the horizontal and vertical directions. A method for compressing input video data is also disclosed.

9 Claims, 6 Drawing Sheets

FLT 1 — 15/16

FLT 2 — 14/16

FLT 3 — 13/16

FLT 4 — 12/16

FLT 5 — 11/16

FLT 6 — 10/16

FLT 7 — 1/16

DATA COMPRESSION APPARATUS FOR VIDEO SIGNAL AND METHOD OF DATA COMPRESSION FOR VIDEO SIGNAL

BACKGROUND OF THE INVENTION

1. Field of the Invention

This invention relates to a data compression apparatus for a video signal and a method of data compression for a video signal. The invention relates particularly to a data compression apparatus for compressing data of still color picture images or color moving image in order to record or transmit the data and to a method of data compressing of the still color picture images or the color moving image in order to record or transmit the data.

2. Description of the Prior Art

Data compression is known which is used for effective recording when image data is recorded on a recording medium such as a magnetic disc, etc. For example, the image data is divided into blocks, each having $N \times N$ pixels and their image data of each block is orthogonal-transformed. The orthogonally transformed data is quantized through given steps. Then, it is subjected to zero-run-length coding or Huffman coding. In such data compression, data is compressed at a high efficiency. However, an amount of coded data is dependent of the image.

Therefore, formerly, the amount of coded data is controlled to remain constant as follows:

A first method is that the amount of actually quantized data through a given quantizing step size is obtained by operation, the quantization is performed again with the number of quantization steps (the quantizing step size) so changed that the amount of data becomes a desired value in accordance with the result of the operation.

A second method is based on that there is a given relation between coefficients of data after the orthogonal transformation and the amount of coded data and is as follows:

Sum of squares of coefficients at each clock is obtained by operation. Each block is classified into four classes, for example, in accordance with the obtained sum. Then, many bits are allotted to a block whose class is of a large amount of data and a few bits are allotted to a block whose class is of a small amount of data.

However, in the above-mentioned first method, high speed processing is difficult because processing of calculation of the amount of actually quantized data should be repeated at least twice.

In the above-mentioned second method, complicated processing is necessary because orthogonal transform processing as well as addition of information indicative of class to data is required, so that the amount of coded data becomes large.

SUMMARY OF THE INVENTION

The present invention has been developed in order to remove the above-described drawbacks inherent to the conventional data compression apparatus for the video signal and a method of data compression for a video signal.

According to the present invention there is provided a first data compression apparatus for video data having: a divider for dividing the video data into unit blocks, a converter for orthogonally converting the video data at each of unit blocks, a quantizer for quantizing the orthogonally converted video data, and a coder for run-length-coding the quantized video data, comprising: a first detector for detecting powers of the video data in the horizontal and vertical directions within given bandpasses respectively; a second detector for detecting a difference between the powers; and a controller for controlling the amount of coded data produced by the run-length-coding in accordance with a total of the powers and the difference. This apparatus controls the amount of coded data in accordance with power of input video data and difference between powers of video data of the horizontal and vertical directions.

According to the present invention there is also provided a second data compression apparatus as the first data compression apparatus, wherein the controller comprises: a horizontal bandpass limiter responsive to the total and the difference for limiting bandpass of the video data before the orthogonal converting with bandpass width thereof controlled in accordance with the total; and a vertical bandpass limiter for limiting bandpass of the video data before the orthogonal converting with bandpass width thereof controlled in accordance with the total, center frequencies of the first and second bandpass limiter being different from each other, bandpass widths of the horizontal and vertical bandpass limiter means being controlled differently in accordance with the difference.

According to the present invention there is also provided a third data compression apparatus as first data compression apparatus, further comprising a step size controller for determining a step size of quantizing performed by the quantizer in accordance with the difference and the total power and for causing the quantizer to quantize the video data using the determined step size.

According to the present invention there is also provided a fourth data compression apparatus for video data having: a divider for dividing the video data into unit blocks, a converter for orthogonally converting the video data at each of unit blocks, a quantizer for quantizing the orthogonally converted video data, and a coder for run-length-coding the quantized video data, comprising: a filter processing circuit for filtering the video data in the horizontal and vertical directions separately; a power detector for detecting powers of the video data in the horizontal and vertical directions; a difference detector for detecting a difference between the powers of the video data filtered in the horizontal and the vertical directions; a amount-of-code converter for, in accordance with the difference, converting a total of the powers to an amount of data which is a predictive value indicative of an amount of data run-length-coded; a target setting circuit for setting a first target; a bandpass limiting value converter for producing bandpass limiting values of the horizontal and vertical direction in accordance with difference between the first target value and the amount of coded data; a bandpass limitation value converter for producing a bandpass limitation values of horizontal and vertical directions in accordance with a difference between the amount of coded data and the first target; a target setting circuit for setting a second target of the amount of coded data of the video data; a step size converter for producing a step size signal in accordance with the second target, the amount of coded data, and the bandpass limitation values; a bandpass limitation controller for controlling bandpass limitation of the video data before processed by the orthogonal converter in horizontal and vertical directions in accordance with the bandpass limitation values; and a quantizer for quantizing the video data orthogonally converted with quantizing step size thereof controlled in accordance with the step size signal.

According to the present invention there is also provided a method of data-compressing for video data having the steps of: dividing the video data into unit blocks, orthogonally converting the video data at each of unit blocks, quantizing the orthogonally converted video data, and run-length-coding the quantized video data, comprising the steps of: detecting powers of the video data in the horizontal and vertical directions within given bandpasses respectively; detecting a difference between powers; and controlling the amount of coded data produced by the run-length-coding in accordance with the powers.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described an embodiment of this invention.

Figure 1:
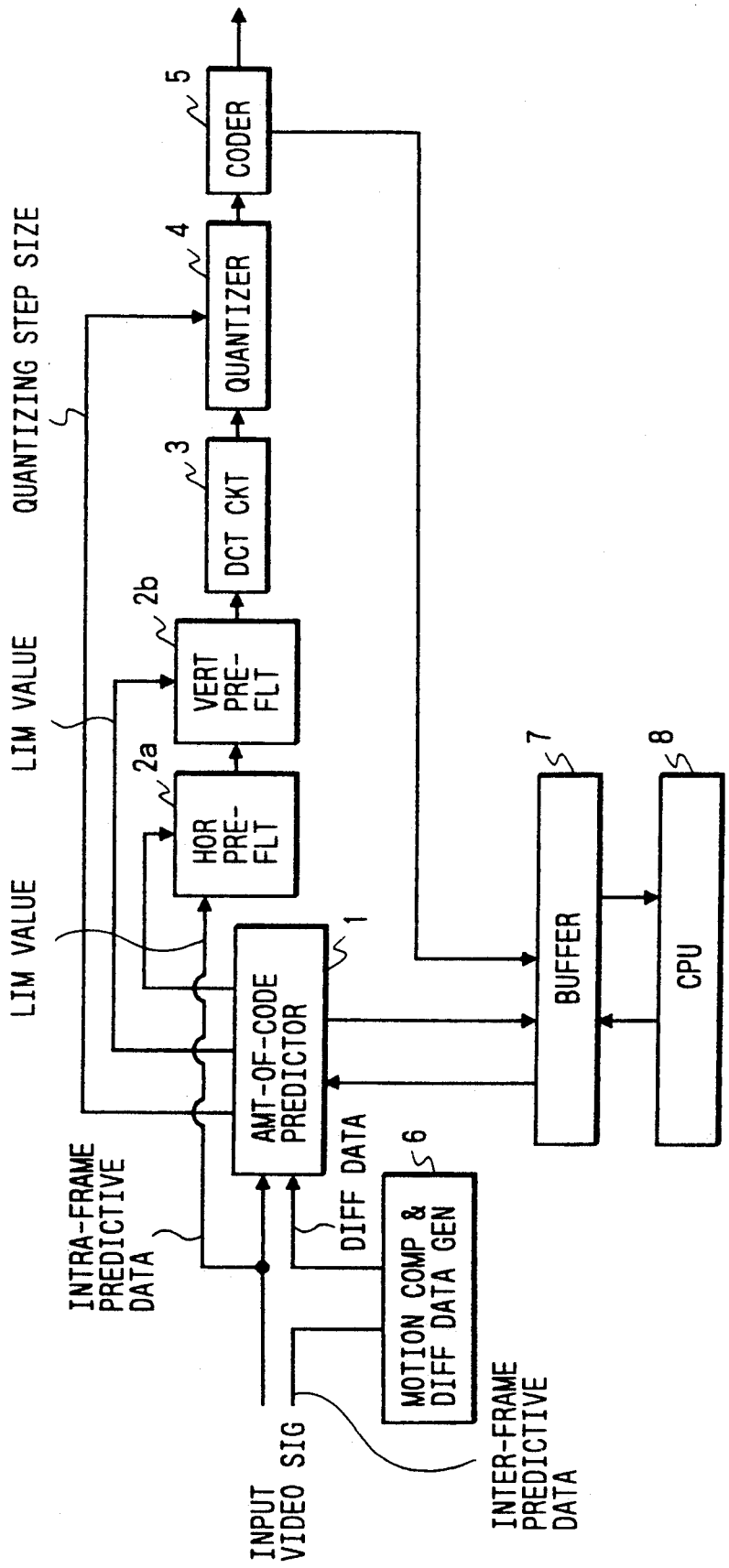
FIG. 1 is a block diagram of an embodiment of the invention of the data compression apparatus.
Figure 2:
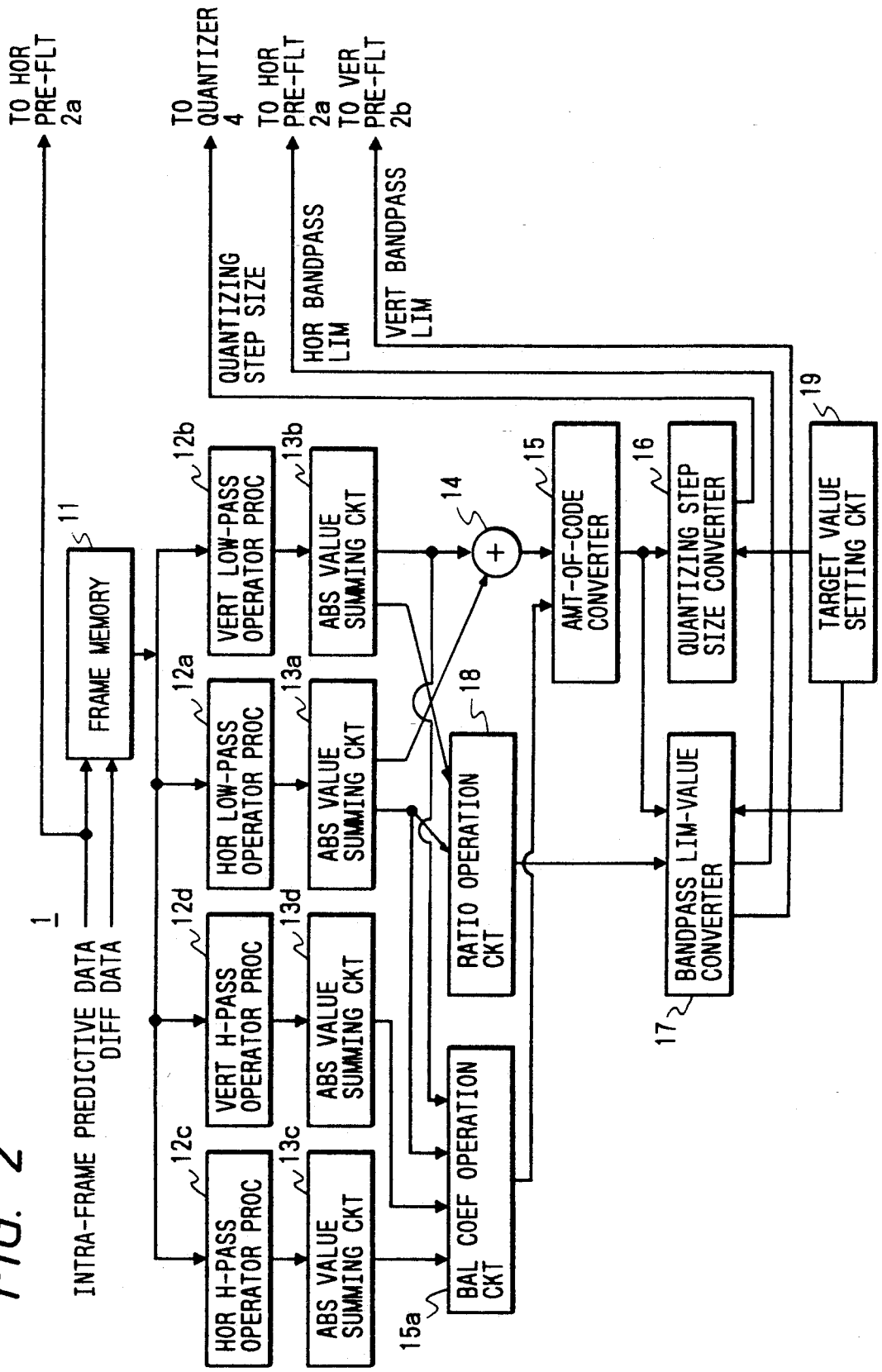
FIG. 2 is a block diagram of the embodiment showing a part of FIG. 1.

FIGS. 1 and 2 are block diagrams of an embodiment of the data compression apparatus.

In FIG. 1, an input video data includes inter-frame predictive data and intra-frame predictive data. The intra-frame data is directly inputted to an amount-of-code predictor 1. The inter-frame predictive data is inputted to an amount-of-code predictor 1 through a motion-compensation-and-difference data generator 6. The amount-of-code predictor 1 predicts an amount of coded data from the inputted data, sets limitation values of the horizontal and vertical directions and the number of quantization steps (quantizing step size) in accordance with the predicted value, and sends it to a horizontal pre-filter 2a, a vertical pre-filter 2b (bandpass limitation means) and quantizer 4.

Figure 8:
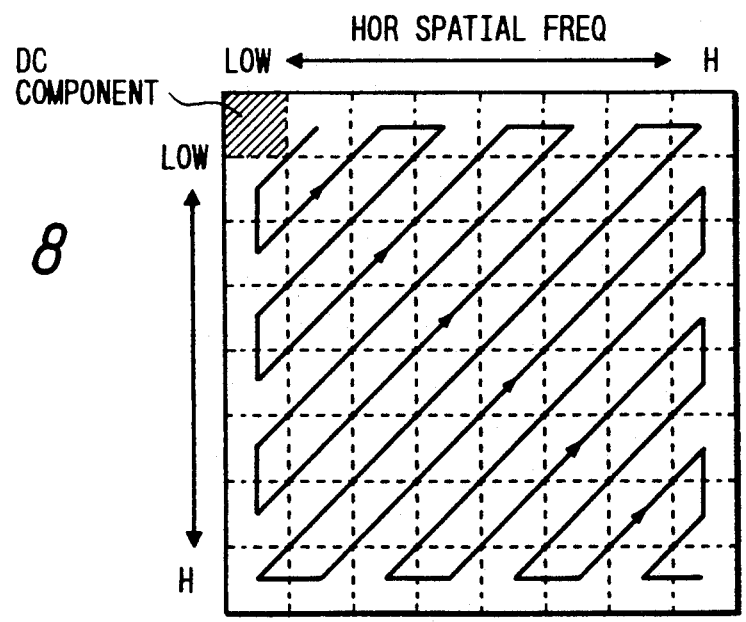
FIG. 8 is an illustration showing zero-run-length coding used in this embodiment.

The horizontal pre-filter 2a limits the inputted video data in bandpass of the horizontal direction in accordance with the bandpass limitation value set by the amount-of-code predictor 1 and sends its output to the vertical pre-filter 2b. The vertical pre-filter 2b limits the inputted data in bandpass of the vertical direction in accordance with the bandpass limitation value set by the amount-of-code predictor 1 and sends its output to a DCT (Discrete cosine transfer) circuit 3. The data processed by the DCT circuit 3 is inputted to a quantizer 4 to quantize the data through quantization steps whose number is set by the amount-of-code predictor 1. The quantized data is inputted to a coder 5 to code it. For example, the quantized data is zero-run-length-coded through zigzag scanning as shown in FIG. 8 (the zigzag scanning is disclosed in "color still picture coding international standardization", vol. 18, No. 6, 1989, Journal of the institute of image electronics engineers of Japan, etc.).

The coder 5 outputs and sends current data as to the amount of coded data to a buffer memory 7 to store the data. A CPU (central processing unit) 8 causes the buffer memory 7 to output and send the data stored in the buffer memory 7 to the amount-of-code predictor 1 in accordance with necessity to feed back it for processing of the next frame.

The amount-of-code predictor 1 has structure as shown in FIG. 2 for example. The input video data is stored in a frame memory 11 temporally. Data read out from the frame memory 11 is filter-processed by horizontal and vertical low-pass (or bandpass) operator processors 12a, 12b and horizontal and vertical high-pass operator processors 12c and 12d (bandpass filtering means). Then, these outputs are inputted to absolute value summing circuits 13a, 13b, 13c, and 13d (operation means) where absolute value summing operation is carried out. That is, a balance coefficient indicative of a balance between sizes of data low-passed in the horizontal and vertical directions and another balance coefficient between sizes of data high-passed in the horizontal and vertical directions are calculated. Outputs of the absolute value summing circuits 13a and 13b are summed to each other by adder 14. A balance coefficient operation circuit 15a calculates a balance coefficient indicative of deviation of a balance among the sums of absolute values from the absolute value summing circuits 13a, 13b, 13c, and 13d in accordance with Eq. 1 mentioned later. Its output is inputted to an amount-of-coded data converter 15 to convert the output of balance coefficient operation circuit 15a to an amount-of-coded data under the condition of the standard quantization step size and standard band-pass limitation in the horizontal and vertical directions. The amount-of-coded data is outputted and sent to a quantizing step size converter 16 and a bandpass limitation value converter 17 (band-pass limitation value converting means).

The absolute value summing circuits 13a and 13b send their outputs to a ratio-of-sum-of-absolute value operation circuit 18 to calculate a ratio therebetween. The calculated ratio is supplied to the band-pass limitation value converter 17.

The quantizing step size converter 16 and band-pass limitation value converter 17 are supplied with target values of the amount of data set by a target value setting circuit 19. The quantizing step size converter 16 compares the amount of coded data inputted from the amount-of-code converter 15 with the target value to output and send a quantizing step size value to the quantizer 4. The band-pass limitation value converter 17 compares the amount value of coded data inputted from the amount-of-code converter 15 with the target values to output and send band-pass limitation values of the horizontal and vertical directions to the horizontal and vertical pre-filters 2a and 2b respectively.

Hereinbelow will be described its operation. The input video data is applied to the frame memory 11 which stores one frame of the video data temporally. Then, the data stored in the frame memory 11 is read out and is supplied to the horizontal and vertical operator processors 12a and 12b and processed there.

This filter processing is described with reference to FIG. 3.

Figure 3:
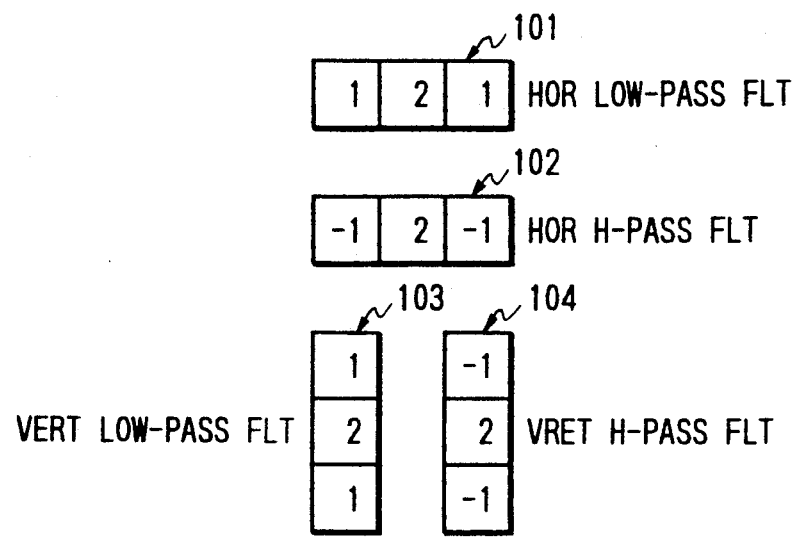
FIG. 3 shows coefficient arrays used in the embodiment.

FIG. 3 shows coefficient arrays used in the embodiment. Coefficient arrays 101 and 102 shows three ($1 \times 3$) coefficients (operators) of the horizontal low-pass filter and high-pass filter respectively. Coefficient arrays 103 and 104 showing three ($3 \times 1$) coefficients of vertical low-pass filter and high-pass filter respectively.

Pixel data in the given region, i.e., $1 \times 3$ or $3 \times 1$ are read out and multiplied by coefficients of $1 \times 3$ or $3 \times 1$ such that one pixel data is multiplied by one of coefficients corresponding to its position. The three data resulted from the multiplication are further added to each other to obtain one total value. Then, the region subsequently read out is shifted, for example shifted in the right by one pixel and $1 \times 3$ or $3 \times 1$ data of the shifted region are read out and the similar processing is executed for the data. Then, this processing is repeated for all data of one frame. In this processing, an amount of shift can be set to two pixels or three pixels instead of one pixel.

Figure 9A:
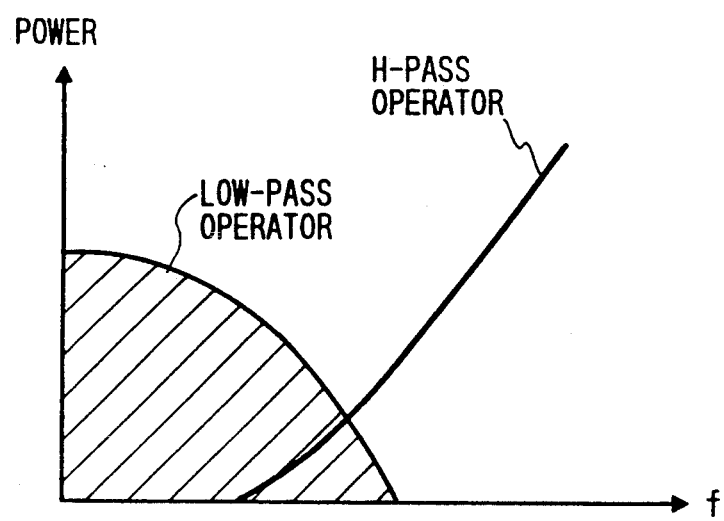
FIGS. 9A and 9B shows bandpass characteristics of a low-pass operator, a high-pass operator, and a bandpass operator used in this embodiment.
Figure 9B:
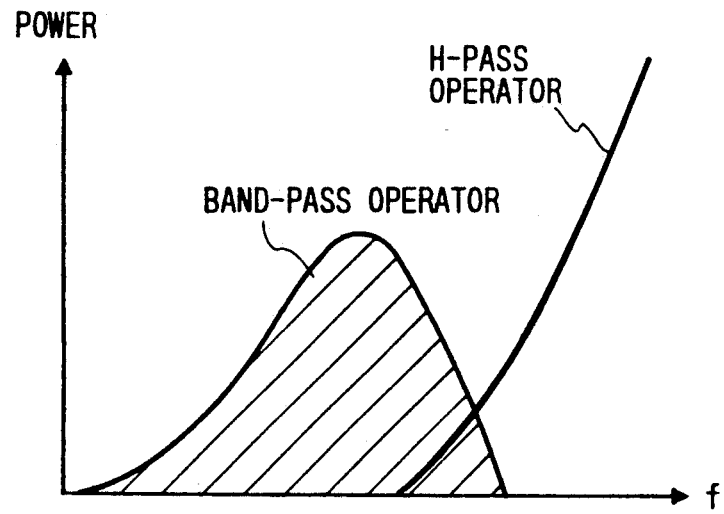

FIG. 9A shows characteristic curves of low-pass operators 12a and 12b and high pass operators 12c and 12d, each indicating change of a power of data with respect to frequency. FIG. 9B shows a characteristic curve of a band-pass operator which can be used in replace with the low-pass operator.

The data filter-processed in the horizontal and vertical direction independently as mentioned above are inputted to the absolute value summing circuits 13a and 13b respectively. The absolute value summing circuits 13a and 13b calculate an absolute value of one data obtained at each filter-processing of $1 \times 3$ or $3 \times 1$ of pixel data and adds up all absolute values over one frame to obtain a total value. Moreover, for example, it is assumed that the absolute values BX, BY, HX, and HY are defined as follows:

BX: a normalized sum of absolute values of the horizontal direction of the low-pass operator;
BY: a normalized sum of absolute values of the vertical direction of the low-pass operator;
HX: a normalized sum of absolute values of the horizontal direction of the high-pass operator;
HY: a normalized sum of absolute values in the vertical direction of the high-pass operator;
HBAR: a balance coefficient of the horizontal direction;
BBAR: a balance coefficient of the vertical direction; and
BAR: a total balance coefficient.

The balance coefficient operation circuit 15a calculates the balance coefficients as follows:

$$BAR = (HBAR + BBAR)/2 \qquad (1)$$

wherein $$HBAR = |a \times HX - HY|/(a \times HX + HY)$$

$$BBAR = |b \times BX - BY|/(b \times BX + BY).$$

This sum of absolute values, i.e., data power is added by the adder 14 and inputted into the amount-of-code value converter 15 together with the balance coefficient as an output value from the balance coefficient calculating circuit 15a. An experiment shows that a value ACTIVITY calculated from the sum of absolute value incoming from the adder 14 as well as the balance coefficient, defined by the following Eq. 2 corresponds to the amount of coded data as shown in FIG. 4.

$$ACTIVITY = (BX + c \times BY) \times (1 + BAR) \qquad (2)$$

wherein
in a non-interlace system, for example, a=1, b=1, c=1
in an interlace system, for example, a=5, b=3, c=2.

Figure 4:
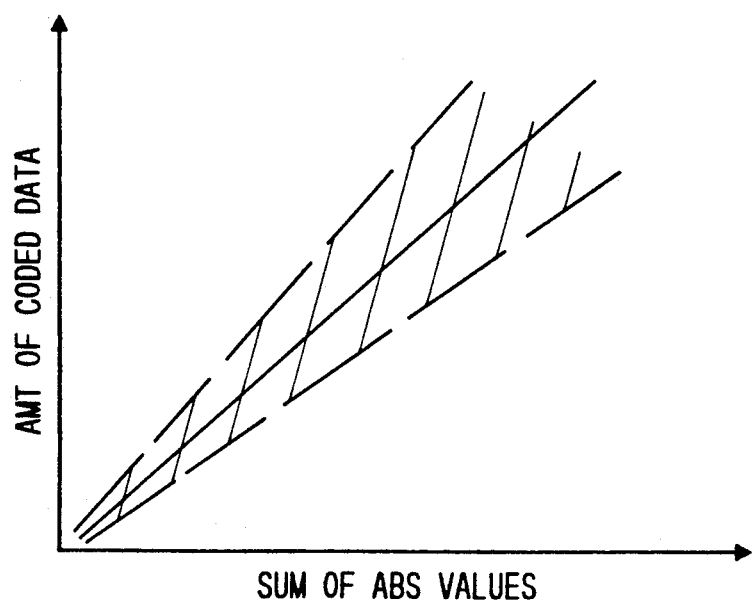
FIG. 4 shows a curve showing a relation between the amount of coded data and sum of the absolute values.

That is, the amount of coded data of video data ranges in the hatched portion region in FIG. 4 when predetermined sum of absolute vales are given. The amount-of-code value converter 15 comprises, for example a ROM (not shown) for storing average values of amount of coded data corresponding to given sum of absolute values. That is, the amount-of-code value converter 15 stores data for obtaining correspondence between the sum of absolute values and the amount of coded data. This ROM of the amount-of-code converter 15 has a main table responsive to the output of the balance coefficient operation circuit 15a and sub-tables, one of sub-tables being selected in response to the result of the main table and the selected sub-table responding to the output of the adder 14.

Such data is experimentally obtained by analyzing a lot of picture data where many picture images are included therein and the amount of coded data is calculated from the analyzed data using a standard band-pass limitation and a quantization through a standard quantizing step size.

The above-mentioned operation prevents an adverse effect on prediction of the amount of coded data by run length coding.

The amount-of-code value converter 15 converts the sum of absolute values inputted from the adder 14 into the corresponding amount value of code and outputs and sends it to the quantizing step size converter 16 and bandpass limitation value converter 17.

The target value setting circuit 19 outputs and sends a target value of the amount of data to the quantizing step size converter 16 and another target value of the bandpass limitation to the bandpass limitation value converter 17 respectively. The quantizing step size converter 16 comprises, for example a ROM for storing the number of quantizing steps for controlling the amount of coded data to a given amount of coded data. The bandpass limitation converter 17 comprises also a ROM (not shown) responsive to outputs of the ratio-of-amount-of absolute value operation circuit 18 and the amount-of-code converter 15 for producing bandpass limitation values. This ROM of the bandpass limitation value converter 17 has a main table responsive to the output of the ratio-of-amount-of-absolute value operation circuit 18 and sub-tables, one of sub-tables being selected in response to the result of the main table and the selected sub-table responding to the output of the amount-of-code converter 15.

Therefore, the quantizing step converter 16 compares the amount of coded data inputted from the amount-of-code converter 15 with the target value inputted from the target value setting circuit 19 and reads out the number of quantizing steps in accordance with the error, i.e., the result of comparison, to control the amount of data to the target value. It sends its output to the quantizer 4. The bandpass limitation value converter 17 compares the amount of coded data inputted from the amount-of-code converter 15 with the target value inputted from the target value setting circuit 19 and reads out the preset horizontal and vertical bandpass limitation values in accordance with the error to control the amount of coded data to the target value. It sends its output to the horizontal and vertical pre-filters 2a and 2b.

Figure 5:
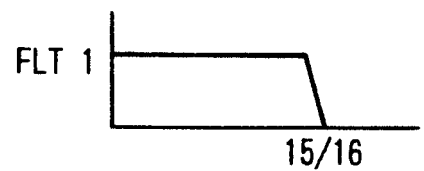
FIG. 5 shows bandpass characteristics of pre-filters used in the embodiment.
Figure 5:
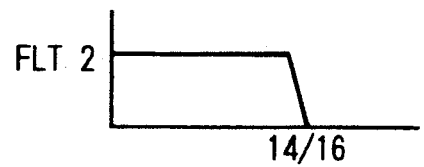
Figure 5:
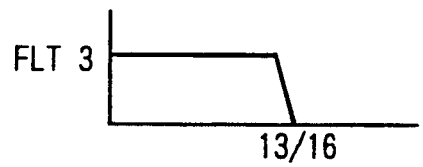
Figure 5:
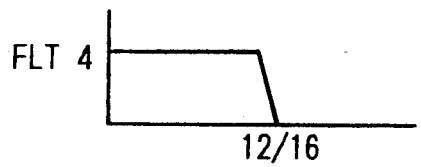
Figure 5:
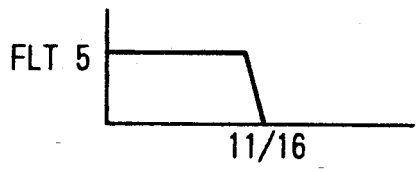
Figure 5:
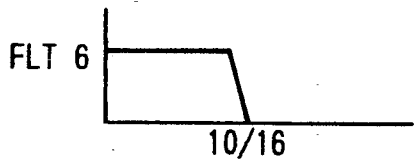
Figure 5:
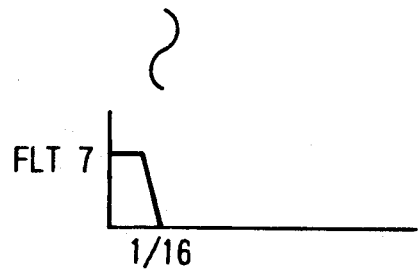

The horizontal pre-filter 2a (the vertical pre-filter 2b being the same) comprises fifteen filters whose frequency characteristics are different from each other such that the bandpass limitation value (cut off frequency) changes from 15/16 to 1/16 by 1/16 of the reference value as shown in FIG. 5. It selects one of these filters in accordance with the bandpass limitation value inputted from the bandpass limitation value converter 17. The selected filter supplies the data subjected to the bandpass limitation to the DCT circuit 3.

Figure 6:
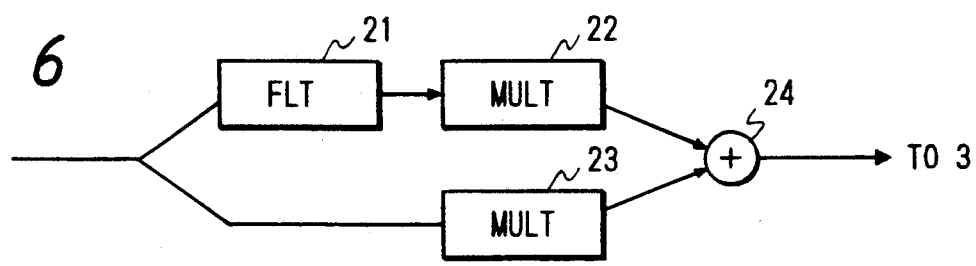
FIG. 6 is a block diagram of a modified arrangement of the pre-filter of the embodiment.
Figure 7:
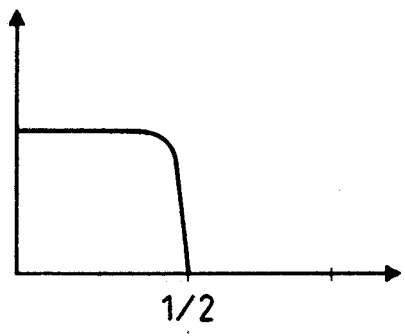
FIG. 7 shows a bandpass characteristic of a filter used in the modified arrangement.

Further, the horizontal pre-filter 2a (also the vertical pre-filter 2b) can be built up as shown in FIG. 6.

In this arrangement, the horizontal pre-filter 2a comprises a filter 21, multipliers 22 and 23, and adder 24. The filter 21 has the bandpass limitation value of a half of the reference value.

The input data is subjected to bandpass limitation by the filter 21 and then, applied to the multiplier 22. The multiplier 22 multiplies one of coefficients selected from 16/16 to 0/16 in accordance with the input level ranging from zero to sixteen. Outputs of the multipliers 22 and 23 are added to each other by the adder 24 and its output is sent to the DCT circuit 3.

TABLE 1

| LEVEL | 0 | 1 | 2 | ... | 16 |
|---|---|---|---|---|---|
| MULTIPLIER 22 | 0/16 | 1/16 | 2/16 | ... | 16/16 |
| MULTIPLIER 23 | 16/16 | 15/16 | 14/16 | ... | 0/16 |

This structure also provides the operation which is similar to that shown in FIG. 5.

Moreover, the balance between the bandpass limitation values of the horizontal direction and vertical directions is adjusted as follows:

As shown in Table 2, reduction in the amount of coded data is calculated statistically in advance when the bandpass limitation values of the horizontal and vertical directions are set to one of values from 0/16 to 16/16. In table 2, it is assumed that the amount of coded data is reduced by 25% by bandpass limitation, there are seventeen combinations. The reduction value is set in accordance with the target value of the amount of coded data. Selection of one combination from the possible combinations is carried out in accordance with the ratio of sums of absolute values.

TABLE 2

(UNIT: %)

|  |  | HORIZONTAL BANDPASS LIMITATION VALUE | | | | | |
|---|---|---|---|---|---|---|---|
|  |  | 0/16 | 1/16 | 2/16 | 3/16 | ... | 16/16 |
| VERTICAL | 0/16 | 0 | 1.5 | 3 | 4.5 | ... | 25 |

TABLE 2-continued (UNIT: %)

|  |  | HORIZONTAL BANDPASS LIMITATION VALUE | | | | | |
|---|---|---|---|---|---|---|---|
|  |  | 0/16 | 1/16 | 2/16 | 3/16 | ... | 16/16 |
| BANDPASS LIMITATION VALUE | 1/16 | 1.5 | 3 | 4.5 | ... | 25 | ... |
|  | 2/16 | 3 | 4.5 | ... | ... | ... | ... |
|  | 3/16 | 4.5 | ... | 25 | ... | ... | ... |
|  | . | ... | 25 | ... | ... | ... | ... |
|  | . | ... | 5 | ... | ... | ... | ... |
|  | 16/16 | 25 | ... | ... | ... | ... | 50 |

That is, the bandpass limitation value for a large amount of coded data is set to be small and that for a small amount of coded data is set to be higher because the ratio of the amount of coded data between the horizontal direction and the vertical direction can be estimated from the ratio of sums of absolute values.

The balance between the bandpass limitation value $H_L$ of the horizontal direction and the bandpass limitation value $V_L$ of the vertical direction is set, for example, as follows:

$$H_L{:}V_L = V/(H+V){:}(H+V)$$

wherein H is the sum of absolute value of the horizontal direction and V is the sum of absolute value of the vertical direction.

Moreover, if weighting is carried out in either of the horizontal or the vertical direction selected in accordance with a type of picture image, for example, it is effected as follows:

$$H_L{:}V_L = \alpha V/(H+V){:}(1-\alpha)H/(H+V)$$

wherein $\alpha$ is a given value and selected from zero to one.

Moreover, it is effective that the change of the bandpass limitation is allowed to be only one level to prevent sudden deterioration in resolution of picture image. In this case, decision as to which direction of H and V directions to be changed is selected in accordance with which one of output values 12a and 12b is larger.

The DCT circuit 3 divides data inputted from the vertical pre-filter 2b into blocks and effects orthogonal conversion. The orthogonal-converted data is inputted to the quantizer 4.

The quantizer 4 quantizes the input data through the quantizing steps (step sizes) whose number is set by the quantizing step converter 16 and sends its output to the coder 5. The larger the number of steps, the larger the amount of coded data. The coder 5 performs the run length coding or both of run length coding and Huffman coding using the quantized data.

As shown in FIG. 1, the intra-frame predictive data out of input video data is directly inputted to the amount-of-code predictor 1 and processed therein. On the other hand, the inter-frame data is inputted into the motion compensation and difference data generator 6. Then, motion compensation is carried out. After this, the difference is generated between the reference video data and the inter-frame predictive video data. The difference data is inputted into the amount-of-code predictor 1.

The bandpass limitation is carried out by change of one filter selected from filters of cut-off frequencies from 15/16 to 1/16 as shown in FIG. 5. Alternatively, the amount of coded data can be controlled finally by reducing bandpass range of the input picture image as follows:

Data passed through the filter 21 of ½ cut-off frequency and data not passed through the filter 21 are added with a ratio of sixteen divisions changed with the limitation value.

What is claimed is:

1. A data compression apparatus for video data having: dividing means for dividing said video data into unit blocks, converting means for orthogonally converting said video data at each of unit blocks, quantizing means for quantizing said orthogonally converted video data, and coding means for run-length-coding said quantized video data, comprising:
    (a) first detection means for detecting sums of absolute values of said video data in horizontal and vertical directions within given filter passbands, respectively;
    (b) second detection means for detecting a difference between said sums of absolute values; and
    (c) control means for controlling the amount of coded data produced by said run-length-coding in accordance with a difference between said sums of absolute values.

2. A data compression apparatus as claimed in claim 1 wherein said control means comprises:
    (a) horizontal passband limitation means responsive to a total of said sums of absolute values and to said difference for limiting a passband of said video data before said orthogonal converting, a passband width of said horizontal bandpass limitation means controlled in accordance with said total; and
    (b) vertical passband limitation means for limiting a passband of said video data before said orthogonal converting, a passband width of said vertical passband limitation means controlled in accordance with said total, center frequencies of said horizontal and vertical passband limitation means being different from each other, said passband widths of said horizontal and vertical passband limitation means being controlled differently in accordance with said difference.

3. A data compression apparatus as claimed in claim 1, further comprising step size control means for determining a step size of quantizing performed by said quantizing means in accordance with said difference and said total and for causing said quantizing means to quantize said video data using said determined step size.

4. A data compression apparatus as recited in claim 1, further comprising means for deriving a balance coefficient from said difference between said sums of absolute values and means for predicting an amount of coded data in accordance with said balance coefficient.

5. A data compression apparatus as recited in claim 1, wherein said control means controls the amount of the coded data to substantially equal a predetermined target value in accordance with a total of said sums of absolute values and said difference.

6. A data compression apparatus for video data having: dividing means for dividing said video data into unit blocks, converting means for orthogonally converting said video data at each of unit blocks, quantizing means for quantizing said orthogonally converted video data, and coding means for run-length-coding said quantized video data, comprising:
    (a) filter processing means for filtering said video data in horizontal and vertical directions separately;
    (b) detection means for detecting sums of absolute values of said video data in the horizontal and vertical directions;
    (c) difference detection means for detecting a difference between said sums of absolute values of said video data filtered in the horizontal and the vertical directions;
    (d) amount-of-code converting means for, in accordance with said difference, converting a total of said sums of absolute values to an amount of data which is a predictive value indicative of an amount of run-length-coded data;
    (e) first target setting means for setting a first target value;
    (f) passband limiting value converting means for producing passband limiting values of the horizontal and vertical direction in accordance with difference between said first target value and said amount of run-length-coded data;
    (g) passband limitation value conversion means for producing passband limitation values of horizontal and vertical directions in accordance with a difference between said mount of run-length-coded data and said first target value;
    (h) second target setting means for setting a second target value of the amount of run-length-coded data of said video data;
    (i) step size converting means for producing a step size signal in accordance with said second target value, said amount of run-length-coded data, and said passband limitation values;
    (j) passband limitation control means for controlling passband limitation of said video data before processing by said orthogonally converting means in horizontal and vertical directions in accordance with said passband limitation values; and
    (k) quantizing means for quantizing said orthogonally converted video data, a quantizing step size of said quantizing means controlled in accordance with said step size signal.

7. A method of data-compressing for video data having the steps of: dividing said video data into unit blocks, orthogonally converting said video data at each of unit blocks, quantizing said orthogonally converted video data, and run-length-coding said quantized video data, comprising the steps of:
    (a) detecting sums of absolute values of said video data in horizontal and vertical directions within given filter passbands respectively:
    (b) detecting a difference between said sums of absolute values; and
    (c) controlling the amount of coded data produced by said run-length-coding in accordance with said sums of absolute values.

8. A method as claimed in claim 7, wherein said step (c) comprises the steps of:
    (a) in response to a total of said sums of absolute values and to said difference, passband-limiting said video data before said orthogonally converting, a first passband width for said passband-limiting being controlled in accordance with said total of said sums of absolute values; and
    (b) in response to said total and to said difference, passband-limiting said video data before said orthogonally converting, a second passband width for said passband-limiting being controlled in accordance with said total of said sums of absolute values, center frequencies of said first and second passband widths being different from each other, said first and second passband widths being controlled differently in accordance with said difference.

9. A method as claimed in claim 8, wherein said step (c) further comprises a step of producing a quantizing step size control signal in accordance with said total and said difference, wherein said orthogonally converted video data is quantized with a quantizing step size controlled in accordance with said quantizing step size control signal.

* * * * *